United States Patent
Kotagiri et al.

(10) Patent No.: US 11,569,893 B1
(45) Date of Patent: Jan. 31, 2023

(54) USER EQUIPMENT TRAJECTORY BASED BEAM SELECTION

(71) Applicant: NEC Corporation, Tokyo (JP)

(72) Inventors: Dheeraj Kotagiri, Tokyo (JP); Eiji Takahashi, Tokyo (JP); Takeo Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/545,975

(22) Filed: Dec. 8, 2021

(51) Int. Cl.
*H04B 7/06* (2006.01)
*H04B 7/08* (2006.01)

(52) U.S. Cl.
CPC ......... *H04B 7/0695* (2013.01); *H04B 7/0632* (2013.01); *H04B 7/088* (2013.01)

(58) Field of Classification Search
CPC ..... H04B 7/0695; H04B 7/0632; H04B 7/088
USPC ........................................................ 375/262
See application file for complete search history.

(56) References Cited

U.S. PATENT DOCUMENTS

| | | |
|---|---|---|
| 2005/0037799 A1 | 2/2005 | Braun et al. |
| 2012/0208571 A1* | 8/2012 | Park .................. H04W 4/02 455/466 |
| 2020/0059898 A1* | 2/2020 | Osawa .............. H04W 74/0833 |
| 2020/0228184 A1* | 7/2020 | Venugopal ............ H04L 5/0051 |
| 2021/0105057 A1 | 4/2021 | Lundborg et al. |
| 2021/0184989 A1 | 6/2021 | Wu et al. |

FOREIGN PATENT DOCUMENTS

| | | |
|---|---|---|
| EP | 3308569 B1 | 12/2019 |
| EP | 3869847 A1 | 8/2021 |
| WO | 2019125255 A1 | 6/2019 |
| WO | 2020214168 A1 | 10/2020 |

OTHER PUBLICATIONS

Mitch Bryson et al., "Co-operative Localisation and Mapping for Multiple UAVs in Unknown Environments", 2007 IEEE Aerospace Conference, 2007, pp. 1-12, doi: 10.1109/AERO.2007.352850, 12pp.

(Continued)

*Primary Examiner* — Leila Malek
(74) *Attorney, Agent, or Firm* — Hauptman Ham, LLP

(57) ABSTRACT

A beam selection system that includes a memory operably connected to processing circuitry. The memory configured to store instructions that request call control information from a device; receive a plurality of user equipment (UE) trajectories and parameters from the device; predict with a first artificial intelligence (AI) engine a plurality of beam patterns within a beam index at a plurality of nodes corresponding with a predicted UE location based on the plurality of UE trajectories and parameters of each UE; transmit the plurality of predicted beam patterns to the plurality of nodes corresponding with a corresponding UE of a plurality of UEs; receive a plurality of UE selected beam patterns from the plurality of nodes; train a second AI engine based the plurality of UE selected beam patterns. The processing circuitry is further configured to update the first AI engine based on learned results from the second AI engine.

25 Claims, 9 Drawing Sheets

(56) References Cited

OTHER PUBLICATIONS

Stefan Dorr et al., "Cooperative longterm SLAM for navigating mobile robots in industrial applications", 2016 IEEE International Conference on Multisensor Fusion and Integration for Intelligent Systems (MFI), Sep. 19-21, 2016, pp. 297-303, 7pp.
Joao Gante et al., "Data-aided fast beamforming selection for 5G", in Proc. IEEE Int. Conf. Acoust., Speech Signal Process. (ICASSP), Apr. 2018, pp. 1183-1187, 5pp.
Muhammad Alrabeiah et al., "Deep learning for mmWave beam and blockage prediction using sub-6GHz channels", 2019, arXiv:1910.02900, Nov. 2, 2019, pp. 1-31, 31pp.
Min Soo Sim et al., "Deep Learning-Based mmWave Beam Selection for 5G NR/6G With Sub-6 GHz Channel Information: Algorithms and Prototype Validation", IEEE Aceess, vol. 8, 2020, pp. 51634-51646, 13pp.
Omid Semiari et al., "Integrated millimeter wave and Sub-6 GHz wireless networks: a roadmap for joint mobile broadband and ultra-reliable low-latency communications", IEEE Wireless Commun., vol. 26, No. 2, Apr. 2019, pp. 109-115, 7pp.
Vutha Va et al., "Inverse multipath fingerprinting for millimeter wave V2I beam alignment", IEEE Trans. Veh. Technol., vol. 67, No. 5, May 2018, pp. 4042-4058, 17pp.
Sajad Rezaie et al., "Location- and Orientation-Aided Millimeter Wave Beam Selection Using Deep Learning", 2020, 3pp.
Vutha VA et al., "Online learning for position-aided millimeter wave beam training", IEEE Access, vol. 7, 2019, pp. 30507-30526, 20pp.
Baldomero Coll-Perales et al., "Sub-6GHz assisted MAC for millimeter wave vehicular communications", IEEE Communications Magazine, Mar. 2019, pp. 125-131, 7pp.

\* cited by examiner

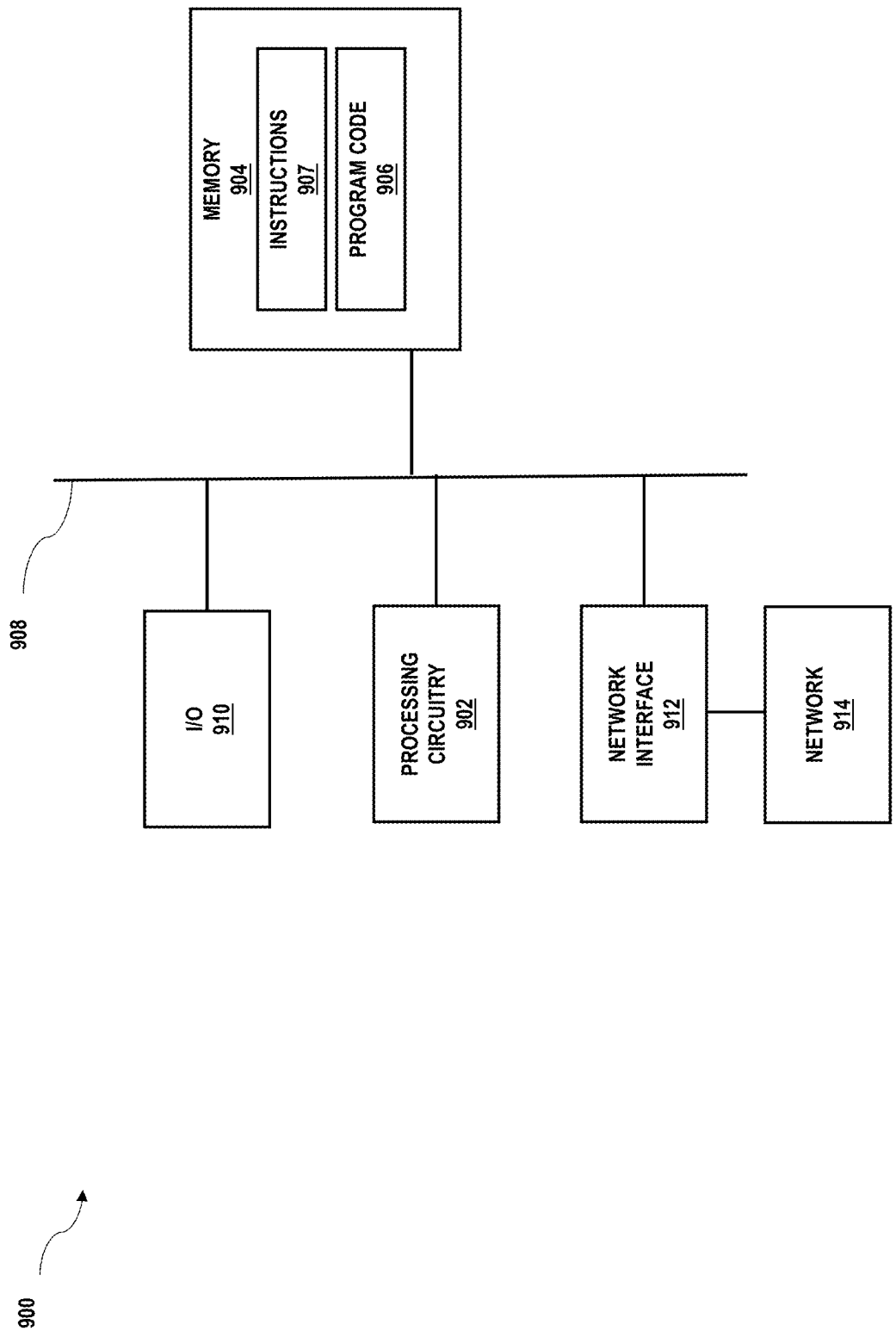

USER EQUIPMENT TRAJECTORY BASED BEAM SELECTION

BACKGROUND

A radio access network (RAN) is part of a mobile telecommunication system and implements radio access technology. Conceptually, the RAN resides between devices such as mobile phones, computers, or any remotely controlled machines and connects with a core network (CN). Depending on the standard, mobile phones and other wireless connected devices are varyingly known as user equipment (UE).

Beam selection is a single beam selection (SBS) concept utilized to minimize the number of radio frequency chains. As the number of beams increases, the difficulty with single beam selection increases. For example, in millimeter-wave (mmWave) multiple-input multiple-output non-orthogonal multiple access (MIMO-NOMA) systems hundreds of beams are available to be selected. In general, SBS is unable to implement a multiple beam group selection opportunity for every supported UE. The high computational burden to measure the decoded message and select a beam optimization prevents support for multiple UEs.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features are arbitrarily increased or reduced for clarity of discussion.

FIG. 9 is a block diagram of a beam selection system in accordance with some embodiments.

DETAILED DESCRIPTION

Figure 1:
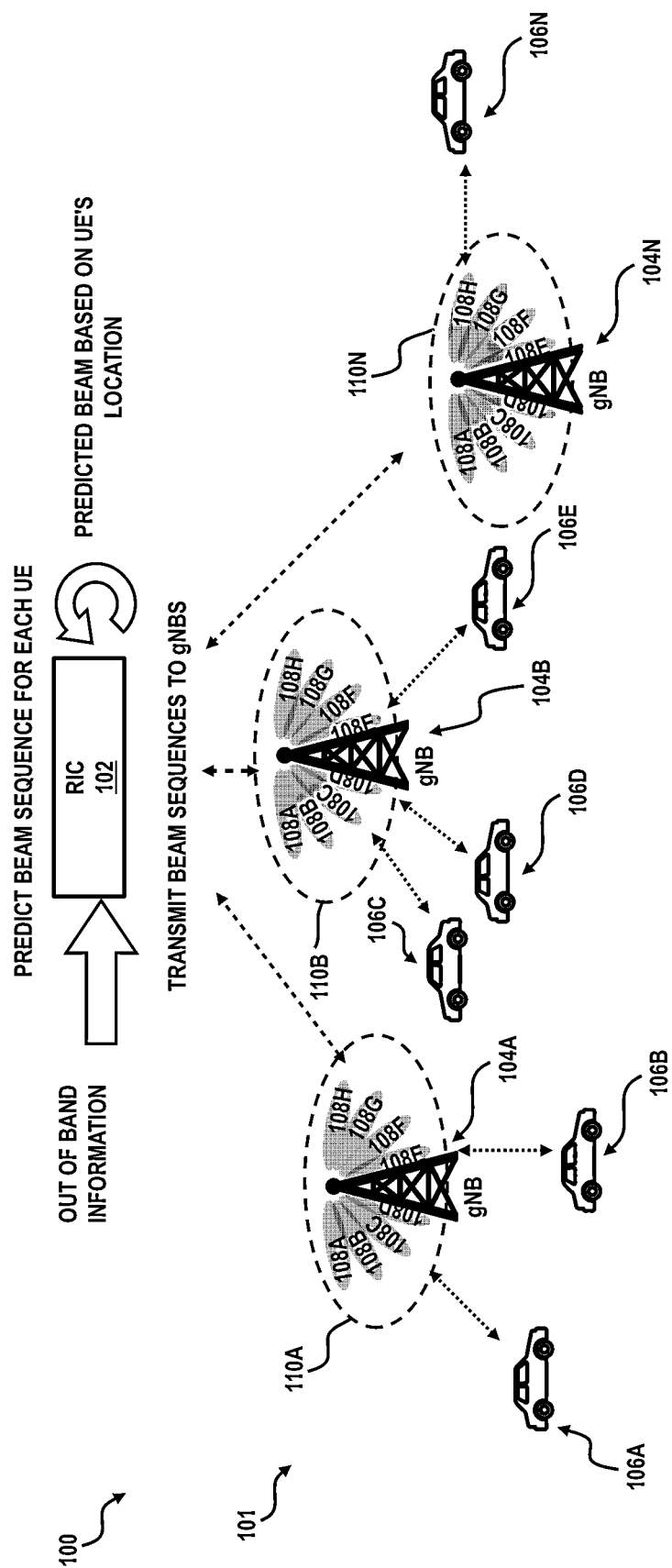
FIG. 1 is a pictorial diagram of a beam pattern selection system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and include embodiments in which additional features are formed between the first and second features, such that the first and second features are not in direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise interpreted accordingly. Use of the term "and/or" means that each option is usable individually or in combination with any, or all, of the other options.

Aspects of the disclosure relate to beam selection in a RAN, such as 5G networks and Internet of things (IoT) networks. IoT describes physical objects (or groups of such objects) that are embedded with sensors, processing ability, software, and connect and exchange data with other devices and systems over the Internet or other communications networks. 5G is the fifth generation technology standard for broadband cellular networks and is the planned successor to the 4G networks that connect to most current cellphones. 5G wireless devices in a cell are connected to the Internet and a telephone network by radio waves through a local antenna in the cell.

Beam selection in other approaches, involves a procedure called beam sweeping. Beam sweeping introduces high latency and poor quality of experience (QoE) for mobile UEs in 5G networks, mmWave, and MIMO systems due to frequent beam-sweeping (e.g., a mobile UE is constantly performing beam selection). In general, the traditional SBS concept is unable to implement a multiple beam group selection opportunity for every supported UE within a RAN due to a high computational burden to select beam optimization.

Other beam selection approaches use a GPS enhanced beam selection. However the GPS enhanced beam selection is ineffective in multi-gNB (i.e., multi-node; node being used interchangeably with gNB) systems due to interference between the UEs and the GPS enhanced beam selection approaches being unable to handle the computational burden of several to hundreds of beams for selection. Further, the GPS enhanced beam selection approaches are ineffective in indoor settings (e.g., the GPS signal is unable to be received) and thus are unable to be used in industrial applications (e.g., IoT networks). In the context of 5G networks, there are two types of radio base station nodes: gNodeB (gNB) and next-generation Evolved Node B (ng-eNB). gNB is the 5G radio base station whereas ng-eNB is an upgraded version of the 4G LTE base station.

In some embodiments, a beam selection system proactively selects a beam pattern from a beam index sequence (hereinafter a beam index) in a beamforming 5G network based on the spatial trajectories of UEs. In some embodiments, the beam pattern selection is based on a policy unit deployed at a service management & orchestrator (SMO) in the RAN architecture, such as an Open RAN (O-RAN). In some embodiments, the policy unit includes network operator defined parameters such as UE paths, UE priority levels, UE mobility patterns, and the like. O-RAN architecture is a RAN architecture that integrates a modular base station software stack on off-the-shelf hardware which allows baseband and radio unit components from discrete suppliers to operate seamlessly together.

In some embodiments, a beam prediction application (xAPP) is deployed at a near Real-Time (RT) RIC (RAN Intelligent Controller) to predict optimal beam patterns from beam indices for UEs based on the network operator defined parameters. In some embodiments, xAPP leverages the spatial trajectory (of the UEs) to predict the beam sequence (e.g., the next beam pattern) for the UEs. In some embodiments, xAPP continuously monitors and updates an artificial intelligence (AI) engine configured to periodically use stored beam selection data of the UEs at the near RT-RIC. AI, a superset of machine learning (ML), involves computer algorithms that improve automatically through past experience.

In some embodiments, xAPP reduces latency due to shorter beam sweeping duration (e.g., shorter time spent selecting a beam pattern based on a UE's predicted location and trajectory to a node based on the predicted location). In some embodiments, xAPP produces a decreased beam pattern selection failure rate due to interference prevention among multiple UEs.

Beamforming is a directional signal transmission technique which leverages spatial diversity to achieve higher throughput density. Beamforming or spatial filtering is a signal processing technique used in sensor arrays for directional signal transmission or reception. This is achieved by combining elements in an antenna array in such a way that signals at particular angles experience constructive interference while others experience destructive interference. Beamforming is used at both the transmitting and receiving ends in order to achieve spatial selectivity. Beamforming involves a fixed number of beam directions and choosing the beam pattern for transmission is called beam selection. A beam pattern is selected by sequential beam sweeping where UEs select a beam pattern from a beam index with the highest signal-to-interference-plus-noise ratio (SINR). For purposes of discussion a beam and a beam pattern are described interchangeably. SINR (further known as the signal-to-noise-plus-interference ratio) is a quantity used to give theoretical upper bounds on channel capacity (or the rate of information transfer) in wireless communication systems such as RANs. SINR is defined as the power of a certain signal of interest divided by the sum of the interference power (from all the other interfering signals) and the power of some background noise.

Beam sweeping in other approaches creates latency for a single UE on the order of N*x (where N is a positive integer representing each beam pattern in a beam index and x is approximately 10 ms or the time to determine the beam SINR for each beam pattern). For example, with N transmission beam patterns (i.e., a beam index), performing beam selection takes N*x. To continue the example, in response to one MIMO node with a hundred beam patterns, then the latency is approximately 1 second. That is, beam pattern selection for a single UE takes up to a full second. In MIMO nodes with multiple UEs the latency problem is further exacerbated. For example, for each gNB, the latency is expressed as N*M*x, where M is the number of UEs associated with the gNB. Using the example from above, a full second latency for a single UE is now as high as 10 seconds for 10 UEs. This latency creates lowered customer QoE.

Mobile UEs (especially UEs moving rapidly, such as in a vehicle) are beam switching frequently and thus the beam selection process is frequent. Beamforming (e.g., at mmWave) in other approaches is susceptible to beam failure due to obstruction or poor channel conditions. Further, frequent beam selection occurs due to these obstructions, poor channel conditions, and beam failures. In addition to these shortcomings, large scale MIMO or distributed MIMO involves large numbers of beams (e.g., approximately 100).

In these other approaches, conventional beam selection results in high latency and poor QoE for mobile UEs. Other approaches have proposed deep learning-based mmWave beam selection for 5G NR (New Radio)/6G with sub-6 GHz channel information. The sub-6 GHz channel estimation information is used to predict channel information at mmWave frequencies. The deep learning based model is used to select a beam pattern based on a predicted power delay profile at mmWave frequencies. Nevertheless, simultaneous communication in sub-6 GHz and mmWave is intermittent and thus unreliable. Deep learning (further known as deep structured learning) is part of a broader family of ML methods based on artificial neural networks with representation learning.

In other approaches, a location and orientation-aided millimeter wave beam selection using deep learning is used. In this approach, position and orientation of the receiver is leveraged to recommend a shortlist of the best beam pairs. The approach uses a deep learning based model to capture the beam pair with the highest received signal strength as well as alternative beam pairs. Current location and past data is combined to predict beam selection. Nevertheless, this approach is limited to single transmission and receiver systems and not configured to be used with real-world MIMO systems or multiple UE and gNB MIMO systems. In addition, the approach does not take into account nor prevent the potential interference between multiple UEs.

FIG. 1 is a pictorial diagram of a beam selection system 100 in accordance with some embodiments.

Beam selection system 100 includes a RAN 101 and a RIC 102 wirelessly connected to one or more nodes or gNBs 104 (104A, 104B, . . . and 104N) that are wirelessly connected to one or more UEs 106 (106A, 106B, 106C, 106D, 106E, . . . and 106N) (e.g., within a vehicle or part of the vehicle) through one or more beam patterns 108 (108A, 108B, 108C, 108D, 108E, 108F, 108G, and 108H) included in one or more beam index sequences 110 (110A, 110B, . . . and 110N).

Beam selection system 100 proactively determines a beam pattern 108 for each UE 106 included in RAN 101 based on spatial trajectories of each UE 106. While UEs 106 are shown as vehicles this is for simplicity of description for relatively quick moving UEs or a UE frequently performing beam switching.

Figure 5:
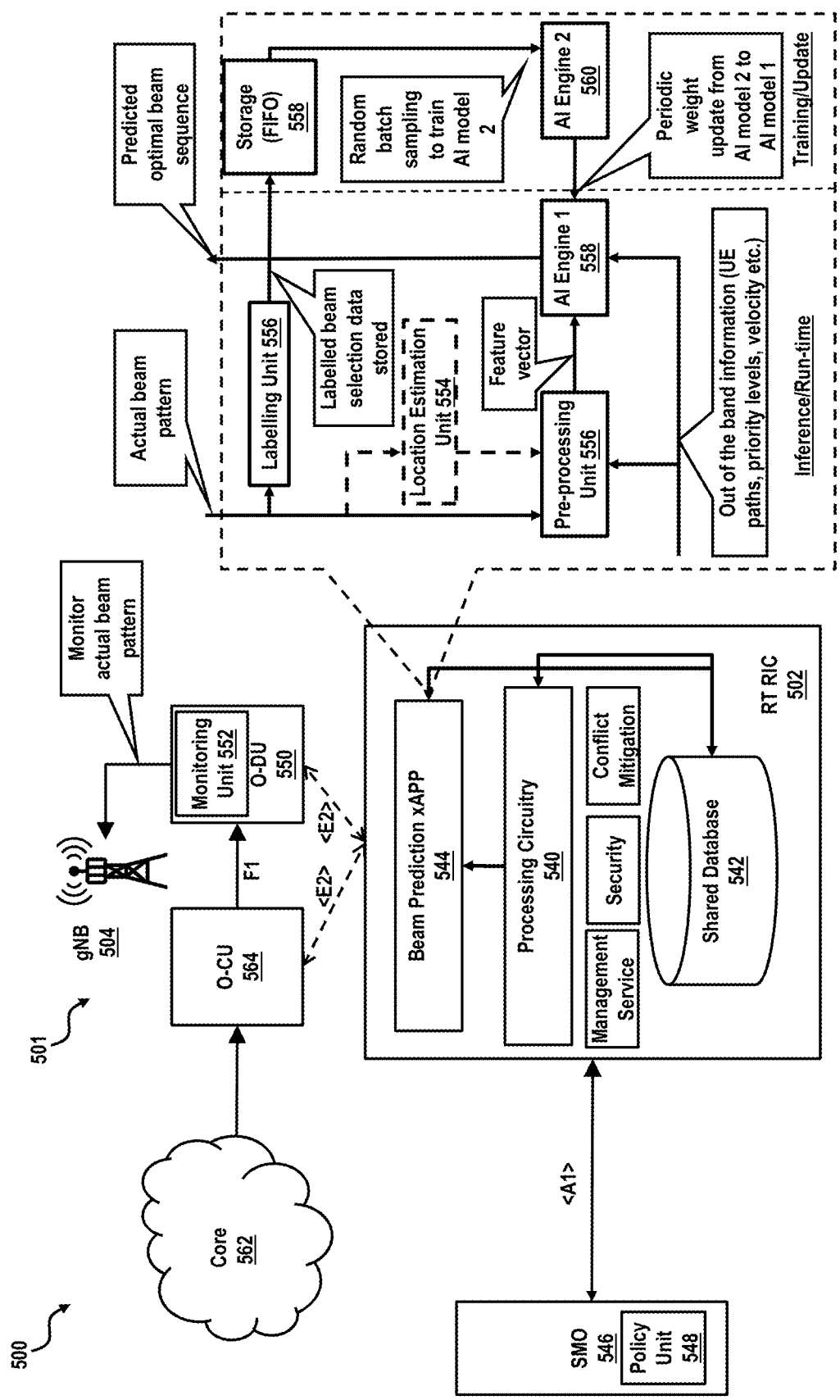
FIG. 5 is a block diagram of a beam pattern selection system in accordance with some embodiments.

RAN 101 is part of a mobile telecommunication system and implements radio access technology. RAN 101 is included between UEs, such as UEs 106, and a CN, such as CN 562 (FIG. 5). In some embodiments, RAN 101 is a global system for mobile communications (GSM) RAN (GRAN), a GSM edge RAN (GERAN), a universal mobile telecommunications system RAN (UTRAN), an evolved UTRAN (E-UTRAN), a cloud RAN (C-RAN), an open RAN (O-RAN), or the like. In some embodiments, a single UE 106 is simultaneously connected to multiple RANs.

In some embodiments, near real-time (RT) RIC 102 includes processing circuitry further accompanied with one or more specialized components to perform certain processing functions and tasks such as one or more digital signal processors (DSP), or one or more application-specific integrated circuits (ASIC). A DSP typically is configured to process real-world signals (e.g., communications) in real time independently of other processing circuitry. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In some embodiments, UEs 106 are a computer or computing system. In some embodiments, UEs 106 have a liquid crystal display (LCD), light-emitting diode (LED) or organic light-emitting diode (OLED) screen interface, such as user interface (not shown), providing a touchscreen interface with digital buttons and keyboard or physical buttons along with a physical keyboard. In some embodiments, UE 106 connects to the Internet and interconnect with other devices. In some embodiments, UE 106 incorporates integrated cameras, the ability to place and receive voice and video telephone calls, video games, and Global Positioning System (GPS) capabilities. In some embodiments, UEs run operating systems (OS) that allow third-party apps specialized for capabilities to be installed and run. In some embodiments, UEs 106 are a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

Beam patterns 108 are radiation patterns of maxima called lobes at various angles, separated by nulls (the space between beam patterns 108) at which the radiation goes to zero. Beamforming or spatial filtering is a signal processing technique used in sensor arrays for directional signal transmission or reception. This is achieved by combining elements in an antenna array in such a way that signals at particular angles experience constructive interference (such as beam patterns 108) while others experience destructive interference (nulls).

In some embodiments, a policy unit 548 (FIG. 5) included at a SMO 546 (FIG. 5) in beam selection system 100 includes network operator defined parameters such as UE paths (e.g., UE historical location data), UE priority levels, UE mobility patterns, and the like. In some embodiments, xAPP 216 (FIG. 2) included at RIC 102 predicts a beam pattern 108 included in beam indices 110 for multiple UEs, such as UEs 106, based on historic beam selection data and relative position of UEs.

In some embodiments, a monitoring unit, such as monitoring unit 552 (FIG. 5), deployed at an O-DU, such as O-DU 550 (O-RAN distributed unit in FIG. 5), in RAN 101 tracks, stores and transmits the beam pattern predictions of RIC 102 and actual UE beam selection data of the UEs 106 to a shared database, such as shared database 542 (FIG. 5), on RIC 102. In some embodiments, O-DU is the distributed unit mounted close to the node, such as gNBs 104, and runs the radio link control (RLC), MAC (a sublayer of 5G NR protocol stack interfaces to the RLC sublayer), and parts of the PHY layer (physical layer that forms the backbone of a RAN). The O-DU includes a subset of the eNB/gNB functions, depending on the functional split option, and its operation is controlled by a control unit, such as control unit 564 (O-CU FIG. 5).

Figure 2:
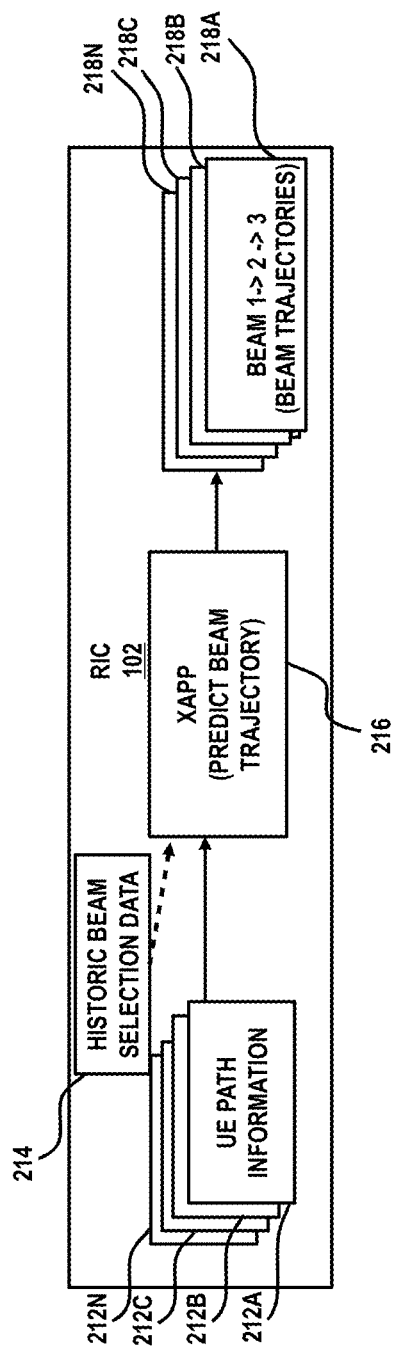
FIG. 2 is a block diagram of a radio access network intelligent controller (RIC) in accordance with some embodiments.

FIG. 2 is a block diagram of a radio access network intelligent controller (RIC) 102 in accordance with some embodiments.

RIC 102 receives out-of-band information from the policy unit, such as policy unit 548 (FIG. 5). Out-of-band information is the data transferred through a stream that is independent from the main in-band data stream. Within the out-of-band information is UE path information 212 (212A, 212B, 212C, . . . 212N) corresponding to multiple UEs, such as UEs 106. In some embodiments, UE path information is a data record of a UE's path (i.e., the UE's trajectory) since entering a RAN, such as RAN 101.

RIC 102 further receives historical beam selection data 214 for each UE, such as UEs 106. Historical beam selection data 214 includes the past beam selection for each UE, such as UEs 106. In some embodiments, historical beam selection data 214 is monitored by the O-DU, such as O-DU 550 (FIG. 5), and transmitted to the RIC 102 where the historical beam selection data 214 is stored in a shared database, such as shared database 542 (FIG. 5).

XAPP 216 is configured to predict a beam trajectory 218 (218A, 218B, 218C, . . . 218N) from a predicted positon of one or more UEs, such as UEs 106, to a node, such as gNBs 104, corresponding to each UE 106. XAPP 216 is configured to determine a beam trajectory 218 from each UE to a corresponding beam pattern 108 within a RAN, such as RAN 101. Beam trajectories 218 are determined using UE path information 212 along with historic beam selection data 214 for each UE to determine a predicted UE position. In some embodiments, from the predicted UE position, a beam trajectory for each UE, such as UEs 106 to a corresponding node, such as one of gNBs 104, is determined. In some embodiments, from beam trajectory 218 to a node, such as one of gNBs 104, a beam pattern, such as one of beam patterns 108, corresponding to each UE is determined. In some embodiments, beam trajectories 218 are used to determine which beam pattern 108 produces the strongest SINR for each UE within a RAN, such as RAN 101.

Figure 3:
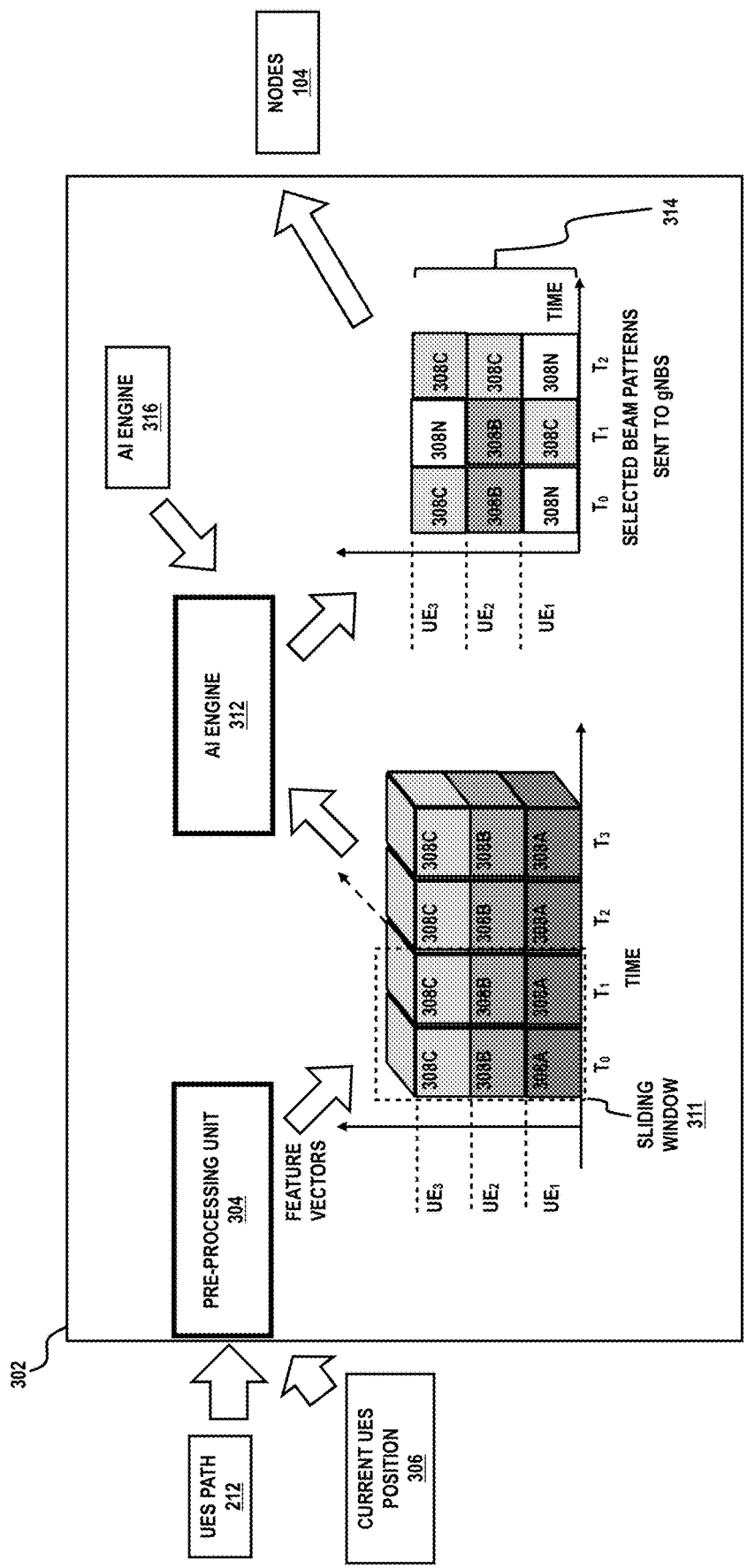
FIG. 3 is a block diagram view of an RIC in accordance with some embodiments.

FIG. 3 is a block diagram view of a RAN intelligent controller (RIC) 302 in accordance with some embodiments.

In some embodiments, RIC 302 is like RIC 102 and is configured for use within beam selection system 100 and interact with RAN 101.

Pre-processing unit 304 receives UE path data 212 for each UE, such as UEs 106, within a RAN, such as RAN 101. Pre-processing unit 304 additionally receives current UE position data 306 for each UE within the RAN. In some embodiments, current UE position data 306 is tracked and sent to RIC 302 by an O-DU, such as O-DU 550 (FIG. 5). In some embodiments, current UEs position data 306 is stored in a shared database, such as database 542. In some embodiments, position data 306 is obtained from a server, such as SMO 546 (FIG. 5), GPS located on the UE and sent to the server or O-DU, sensing information (such as video, received signal strength indicator (RSSI), point cloud data) from the UE and sent to the server or O-DU. In some embodiments, a server is a server such as SMO 546 (FIG. 5), an application server, a multi-access edge computing (MEC) server, the UE processing circuitry, base station processing circuitry (such as O-DU or O-CU), camera's, or other suitable processing circuitry in accordance with some embodiments.

Pre-processing unit 304 generates a UE location estimation and feature vectors for each UE within the RAN. In some embodiments, the feature vectors are determined by UE path data 212, current UE positon data 302, UE priority levels, UE velocity, and the like. Thus, RIC 302 considers past UEs locations and present UEs locations in determining future locations and trajectories of the UEs to predict beam patterns.

AI engine 312 is configured to use long short-term memory (LSTM) with sliding window 311. LSTM with sliding window 311 is a prediction model with more than one-time variable (e.g., $T_0$, $T_1$, $T_2$, $T_3$, and the like) to predict the next step is a sliding window model. For example, the value at $T_0$ and value at $T_1$ is used to predict the value at time $T_2$. The model is developed using the current time $T_1$ and previous times $T_0$ as input variables to predict $T_2$. When made into a regression model, the input variable is $T_0$ and $T_1$ and the output variable is $T_2$.

In some embodiments, AI engine 312 applies a rolling projection or a walk-forward validation model. Each time step of the test dataset will run at the same time. The rolling projection or a walk-forward validation model is configured to make estimates one time period ahead. Observation of beam patterns 308 is available every time period and is used for the next time period's estimates. In some embodiments, observations are made on the previous time periods ($T_1$, $T_0$) and used as inputs to predict beam patterns at the current time ($T_2$).

Based on the combined UE features, such as UE future path/trajectory, current UE position 306, velocity, priority level, AI engine 312 utilizes LSTM with sliding window 311 to determine a sequence of optimal beam patterns 308 (308A, 308B, 308C) within one or more beam indices at a time period (e.g., $T_0$, $T_1$, $T_2$, $T_3$, and the like). In some embodiments, sliding window 311 is a window (e.g., sub-list from a larger list or array) that runs over a large array, such as beam patterns 308A-N, which is an underlying collection of elements. In some embodiments, sliding window 311 is configured to eliminate duplicate iterations and thus reduce latency. A sliding window, such as sliding window 311, takes a sub-list of data from a given array or string, expanding or shrinking that subset to satisfy certain conditions, hence the sliding effect. In some embodiments, windowing is configured to take a large array or string and constrain a view of that array to part of the array or string (e.g., the window). In some embodiments, when a window slides, only two elements change (the oldest value drops off and a newest value comes into the window).

In each beam pattern, such as beam patterns 308A-N, were evaluated for SINR, as discussed above, the latency is N*x for each UE. However, in response to window sliding the latency is approximately 10 ms as the window moves to a predicted location based on the UE feature vectors. As the pre-processing unit 304 has estimated a UE vector, sliding window 311 is moved in the direction in the beam patterns of the anticipated location of the UE.

In some embodiments, the sequence (e.g., the beam patterns 308 within sliding window 311) of optimal beam patterns for each UE (e.g., $UE_3$, $UE_2$, and $UE_1$) at each sequencing time ($T_0$, $T_1$, $T_2$, $T_3$) is processed by AI engine 312. In some embodiments, AI engine 312, is configured as a LSTM with sliding window 311 based model. In some embodiments, LSTM is an improved extension over more commonly used recurrent neural network (RNN) architecture used in deep learning. In some embodiments, LSTM includes a cell, an input gate, an output gate and a forget gate. The cell remembers values over arbitrary time intervals (e.g., $T_0$ and $T_1$) and the three gates regulate the flow of information into and out of the cell.

Thus, as AI engine 312 receives more historical beam pattern selection data, AI engine 312 is trained using historic beam selection data for each UE and is periodically updated in an asynchronous manner by a second AI engine 316. A sliding window technique is best understood as a window of length Y and the pane which is fixed in it of length K. In some embodiments, AI engine 312 trains the window length to have a weight Z*K. In some embodiments, second AI engine 316 modifies weight Z, expanding or contracting the window, based on UE beam pattern selection data. Thus, fine tuning the weight Z based on actual UE beam selected data.

Figure 4:
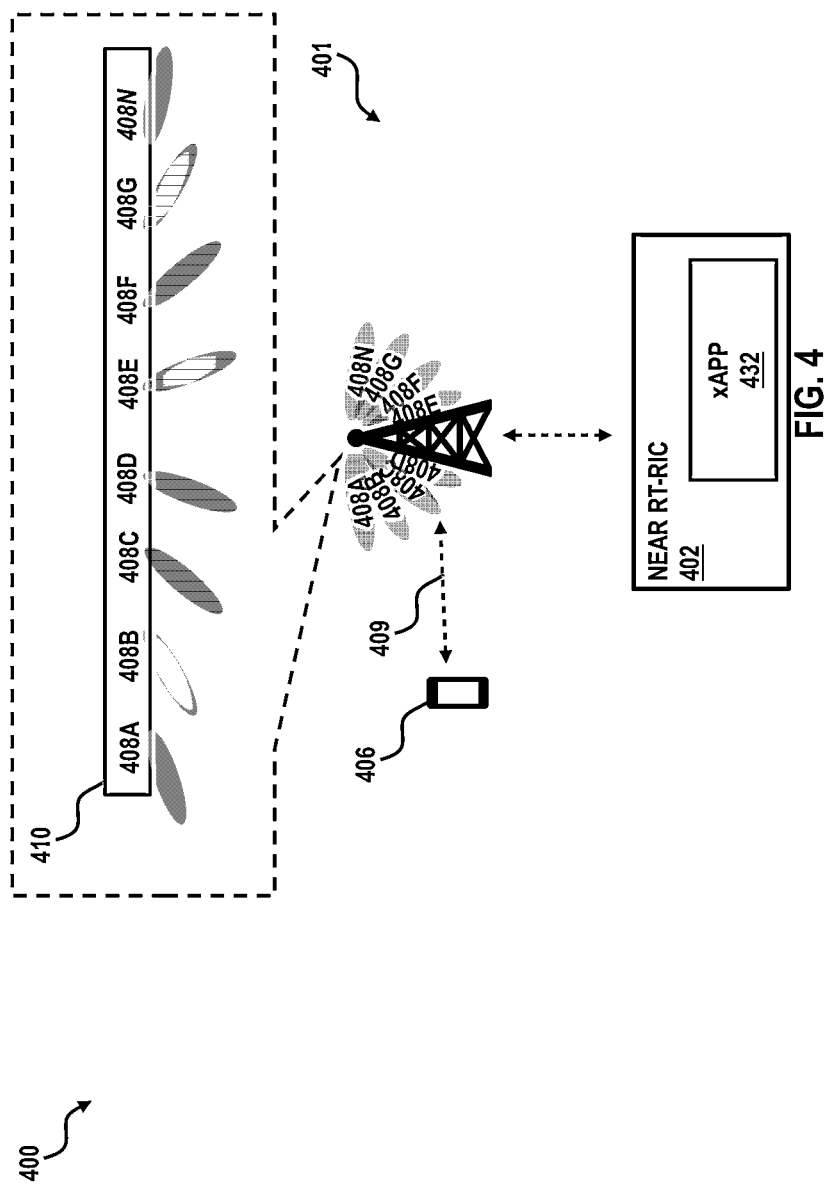
FIG. 4 is a block diagram of a beam pattern selection system in accordance with some embodiments.

As discussed in more detail below, second AI engine 316 determines weighting modifications to the LSTM with sliding window 311 model of AI engine 312 which are periodically updated. AI engine 316 processes random batches of data of actual beam patterns chosen by the UEs to determine the weighting sliding window modifications to AI engine 312 and thus improve the accuracy of AI engine 312. In some embodiments, actual UE selected beam patterns are different from predicted beam patterns 314 which are sent to nodes, such as gNBs 104, FIG. 4 is a block diagram of a beam pattern selection system 400 in accordance with some embodiments.

In some embodiments, beam pattern selection system 400 is like beam selection system 100. In some embodiments, RAN 401 is like RAN 101 and configured to be used within beam pattern selection system 100. In some embodiments, UE 406 is like UEs 106 and is configured to be used within RAN 101.

In some embodiments, a beam selection system 400 proactively selects a beam pattern, such as beam pattern 408C, from a beam index 410 in a beamforming 5G network based on the spatial trajectory 409 of UE 406. In some embodiments, the beam pattern selection is based on a policy unit, such as policy unit 548 deployed at a SMO, such as SMO 546 (FIG. 5), in RAN 401.

In some embodiments, xAPP 432 is like xAPP 216. In some embodiments, xAPP is deployed at a near RIC 402 to predict optimal beam patterns from beam patterns 408A-N in beam index 410 for UE 406 based on network operator defined parameters. In some embodiments, xAPP 432 leverages the spatial trajectory 409 to predict the beam pattern 408C for UE 406. In some embodiments, xAPP 432 continuously monitors and updates an artificial intelligence (AI) engine, such as AI engine 312, configured to periodically use stored beam selection data of UE 406 at the near RIC 402.

In some embodiments, xAPP 432 reduces beam selection latency due to shorter beam sweeping duration (e.g., shorter time spent selecting a beam pattern based on a UE's predicted location and trajectory to a node based on the predicted location) through an AI engine, such as AI engine 312, in selection of beam patterns based on a predicted location. In some embodiments, xAPP 432 produces a decreased beam pattern selection failure rate due to interference prevention among multiple UEs.

Beam sweeping in other approaches, creates latency on the order of N*x (where N is a positive integer representing each beam pattern in a beam index and x is approximately 10 ms or the time to determine the beam SINR for each beam pattern). For example, beam pattern 408C is predicted directly on historic location data and UE trajectory, thus reducing latency to approximately 10 ms.

FIG. 5 is a block diagram of a beam pattern selection system 500 in accordance with some embodiments.

In some embodiments, beam pattern selection system 500 is like beam selection system 400 and 100. In some embodiments, RAN 501 is like RAN 401 and 101 and configured to be used within beam pattern selection system 400 and 100. In some embodiments, RIC 502 is like RIC 402, 302 and 102 and is configured to be used within beam pattern selection systems 400 and 100.

Beam pattern selection system 500 includes RIC 502. RIC 502 includes processing circuitry 540 and memory, such as shared database 542, operably connected to the processing circuitry 540. In some embodiments, shared database 542 is configured to store instructions that when executed by processing circuitry 540 cause processing circuitry 540 to execute beam selection xAPP 544 to predict beam patterns for each UE within RAN 501 using spatial trajectory of each UE.

Figure 6:
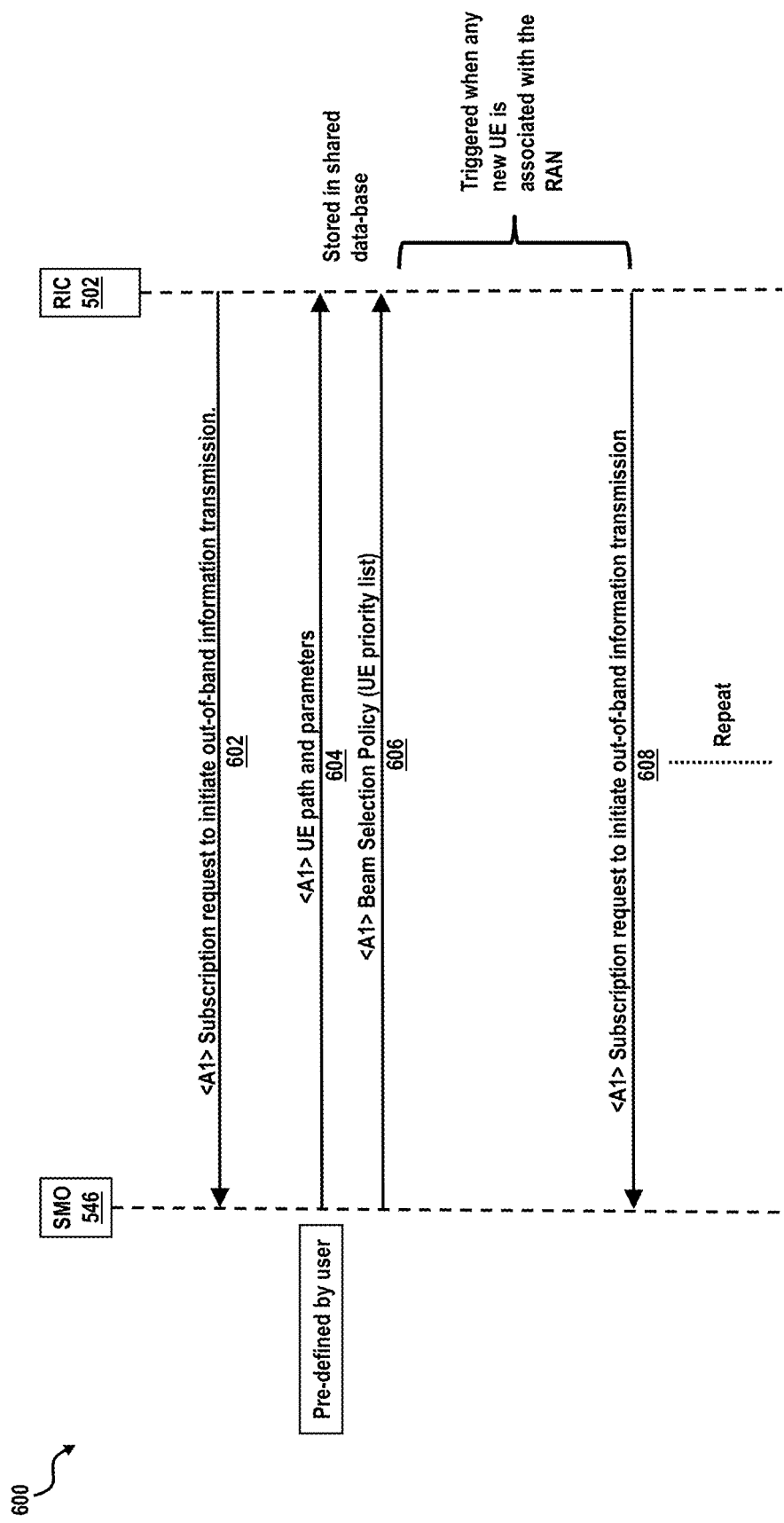
FIG. 6 is a communication flow diagram for a beam selection method in accordance with some embodiments.

With additional reference to FIG. 6 which is a communication flow diagram for a beam selection method 600, RIC 502 is configured to request to initiate out-of-band information transmission from SMO 546 at operation 602. Communication between RIC 502 and SMO 546 is labeled as <A1> for simplicity of discussion in reference to FIG. 5.

RIC 502 requests to initiate out-of-band information transmission with SMO 546 at operation 602. Flow proceeds to operation 604 where SMO 546 responds with UE path and parameters. Additionally, SMO 546 responds with a beam selection policy at operation 606. In some embodiments, a beam selection policy is stored and managed by policy unit 548 included in SMO 546. In some embodiments, the UE path and parameters, beam selection policy, and UE priority list is stored in shared database 542. Flow proceeds to operation 608, which initiates another request for out-of-band transmission, which is triggered when any new UE is associated with RAN 501.

In some embodiments, SMO 546 includes a UE list corresponding to a plurality of UEs. In some embodiments, RIC 502 receives a plurality of UE paths, parameters, and beam selection policies from SMO 546.

Figure 7:
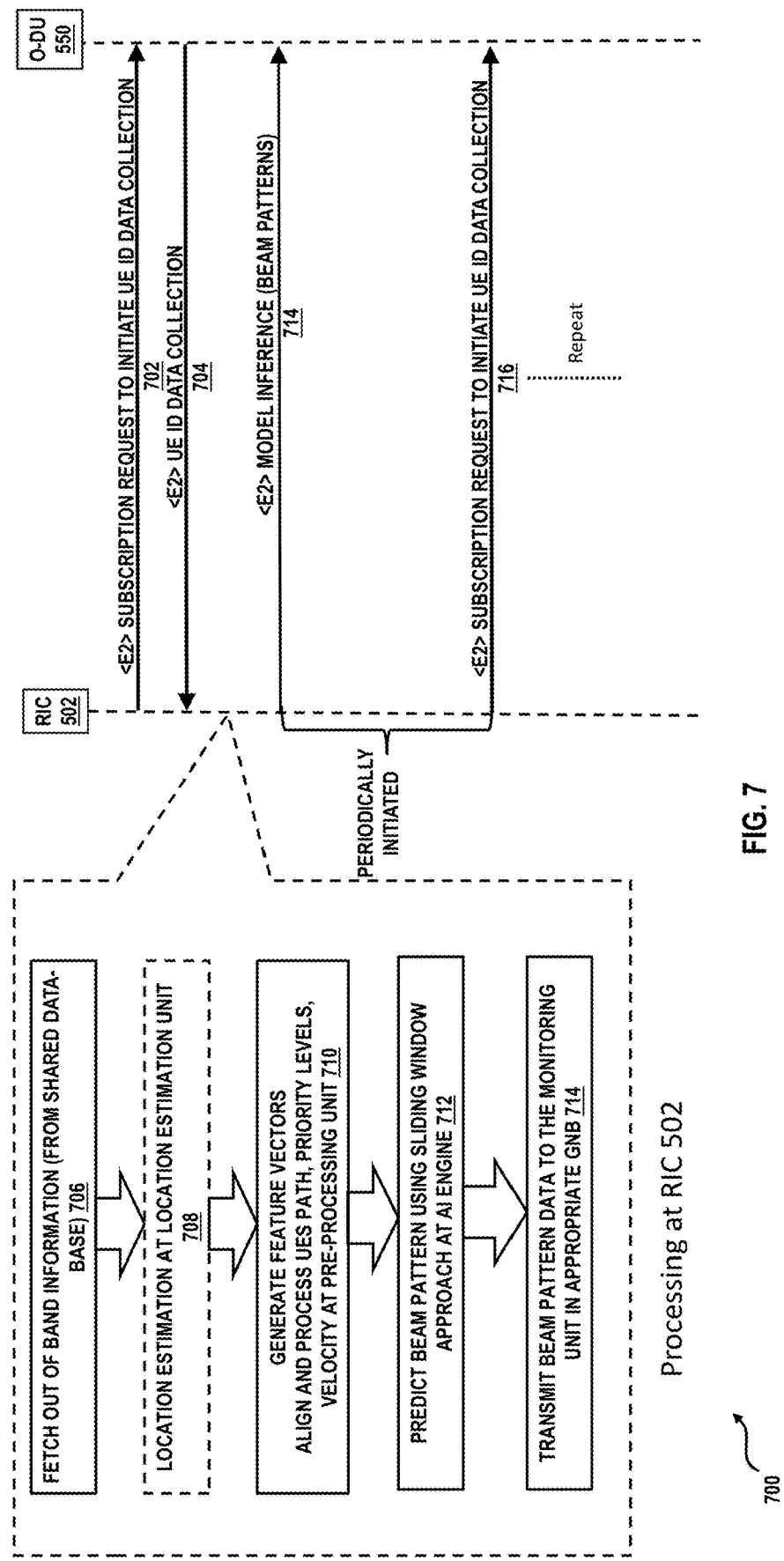
FIG. 7 is a communication flow diagram for a beam selection method in accordance with some embodiments.

With additional reference to FIG. 7 which is a communication flow diagram for a beam selection method 700, RIC 502 is configured to request to initiate a subscription request to initiate UE identification collection from O-DU 550 at operation 702. Communication between RIC 502 and O-DU 550 is labeled as <E2> for simplicity of discussion. O-DU 550 responds with UE identification data that has been collected by monitoring unit 552 included in O-DU 550 at operation 704.

Process flows to operation 706 where the out-of-band information is retrieved from shared database 542 by RIC 502. Process optionally flows to operation 708 where a UE location estimation is obtained from UE location estimation unit 554. Location estimation unit 554, in the absence of localization sensor information, is configured to use the selected UE beam pattern to predict a UE location.

In some embodiments, location estimation unit 554 is configured to use one or more methods to determine a UE's position. In some embodiments, location estimation unit 554 is configured to use UE sensor observations that are sent via an O-DU, such as O-DU 550. In some embodiments, sensor observations are stored in a shared database, such as shared database 542. In some embodiments, in the event no sensor observation data is recorded a simultaneous localization and mapping from (SLAM) algorithm is used. In some embodiments, a SLAM algorithm is located in location estimation unit 554.

In some embodiments, sensor information of all UEs, such as UEs 106, is shared to a map server to generate an up-to-date global map and localize the UEs within the global map. In some embodiments, the map server is part a SMO 546 that provides RIC 502, with UE path and parameters, such as position and velocity. In some embodiments, a map server is included with processing circuitry 540 and stored in shared database 542.

In some embodiments, UE location is retrieved through positioning systems and sensors such as global positioning system (GPS), Wi-Fi fingerprinting based localization, radio frequency identification (RFID) sensors, onboard inertial sensors, or the like.

In some embodiments, in the absence of precise localization sensors, a co-operative long-term SLAM technique is used to estimate a UE's position. In some embodiments, a SLAM algorithm is included in location estimation unit 554 and is a computational construction or updating a map, such as a global map, of an unknown environment while simultaneously keeping track of a UE's location within. In some embodiments, SLAM algorithms are configured to use approximate solution methods that include a particle filter, extended Kalman filter, covariance intersection, and GraphSLAM.

In some embodiments, a SLAM technique is used to estimate the UE's position. However, operation 708 is typically performed when UE sensor information is unavailable.

Process flows from 706 to 710 where pre-processing unit 556 generates the feature vectors, aligns and processes each UE path, UE priority level, and UE velocity. Process flows from operation 710 to operation 712 where AI engine 558 predicts a beam pattern using a sliding window scheme for training an LSTM network as discussed with regards to FIG. 3.

Process flows to operation 714 from operation 712 where the predicted beam pattern data is transmitted to the O-DU 550 for the properly corresponding node (gNB 504). Process flows from operation 714 to operation 716 where periodically the UE identification data is updated.

Figure 8:
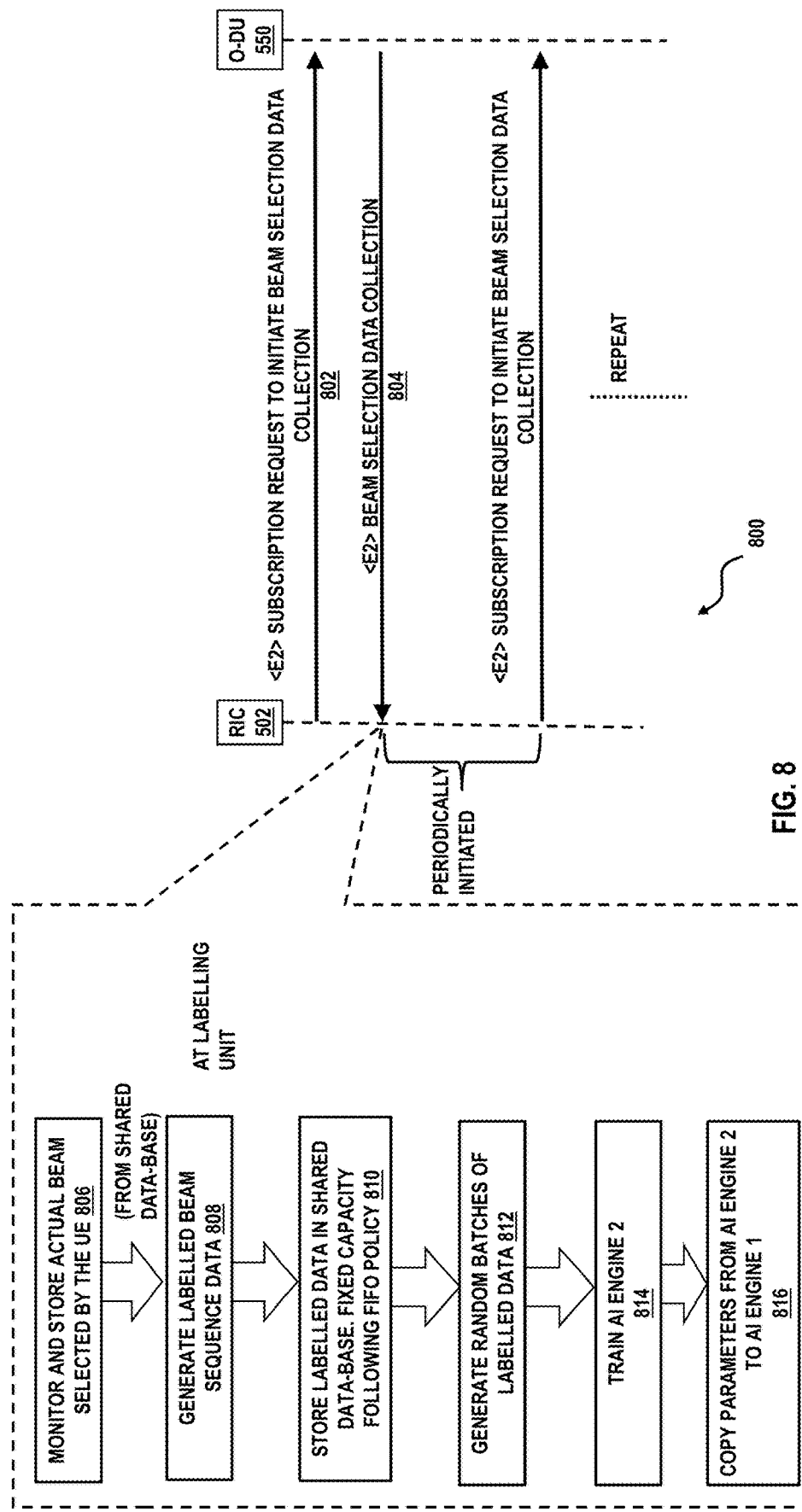
FIG. 8 is a communication flow diagram for a beam selection method in accordance with some embodiments.

With additional reference to FIG. 8 which is a communication flow diagram for a beam selection method 800, RIC 502 is configured to request to initiate UE beam pattern selection data from O-DU 550 at operation 802. Communication between RIC 502 and O-DU 550 is labeled as <E2> for simplicity of discussion. O-DU 550 responds with the collected UE beam pattern selection data at operation 804. In some embodiments, the collected data is the actual beam patterns selected by each UE in RAN 501.

Process flows from operation 804 to operation 806, where RIC 502 monitors and stores the actual UE selected beam patterns in shared database 542. Operation flows to operation 808 where labelling unit 556 generates labelled beam pattern data. Operation flows to operation 810 where the labelled data is stored in shared database 542. FIFO storage 558 is configured, within shared database 542, to include a fixed capacity first in first out (FIFO) structure. Thus, as the fixed capacity is reached, older stored labeled UE beam patterns collected are pushed out with new labeled UE beam patterns collected.

Process flows from operation 810 to operation 812 where random batches of labelled UE actual selected beam patterns are generated. At operation 814 AI engine 2 560 trains, based upon the UE actual beam selected data to better model a UE's movement. At operation 816, window weighting parameters from AI engine 2 560 are copied to AI engine 1 558 to update AI engine 1.

FIG. 9 is a block diagram view of a beam selection system 900 usable for beam pattern selection in accordance with one or more embodiments. The system 900 is further capable of implementing a beam pattern selection system. System 900 includes a hardware processing circuitry 902 and a non-transitory, computer readable storage medium 904 encoded with, i.e., storing, the computer program code 90, i.e., a set of executable instructions. Computer readable storage medium 904 is further encoded with instructions 907 for interfacing with external devices. The processing circuitry 902 is electrically coupled to the computer readable storage medium 904 via a bus 908. The processing circuitry 902 is further electrically coupled to an I/O interface 910 by bus 908. A network interface 912 is further electrically connected to the processing circuitry 902 via bus 908. Network interface 912 is connected to a network 914, so that processing circuitry 902 and computer readable storage medium 904 are capable of connecting to external elements via network 914. The processing circuitry 902 is configured to execute the computer program code 906 encoded in the computer readable storage medium 904 in order to cause system 900 to be usable for performing a portion or all of the operations as described in beam pattern selection systems 100, 400, and 500 (FIGS. 1, 4 and 5), methods 600, 700, and 800 (FIGS. 6, 7 and 8).

In some embodiments, the processing circuitry 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to implement beam pattern selection systems 100, 400, and 500 (FIGS. 1, 4, and 5) and methods 600, 700, 800 (FIGS. 6, 7 and 8). In some embodiments, the storage medium 904 stores instructions 907 for interfacing with external devices. The instructions 907 enable processing circuitry 902 to generate instructions readable by the external devices to effectively implement beam pattern selection systems 100, 400, and 500 (FIGS. 1, 4 and 5) and methods 600, 700, and 800 (FIGS. 6, 7 and 8).

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processing circuitry 902.

System 900 further includes network interface 912 coupled to the processing circuitry 902. Network interface 912 allows system 900 to communicate with network 914, to which one or more other computer systems are connected. Network interface 912 includes wireless network interfaces such as BLUETOOTH, Wireless Fidelity (WIFI), Worldwide Interoperability for Microwave Access (WIMAX), General Packet Radio Service (GPRS), or Wideband Code Division Multiple Access (WCDMA); or wired network interface such as ETHERNET, Universal Serial Bus (USB), IEEE-1394 (Institute of Electrical and Electronics Engineers-1394), a global system for mobile communications (GSM) RAN (GRAN), a GSM edge RAN (GERAN), a universal mobile telecommunications system RAN (UTRAN), an evolved UTRAN (E-UTRAN), a cloud RAN (C-RAN), or an open RAN (O-RAN).

Supplemental Note

An aspect of this description relates to a beam selection system. The beam selection system includes processing circuitry. The beam selection system further includes a memory operably connected to the processing circuitry. The memory is configured to store instructions that when executed by the processing circuitry cause the processing circuitry to request call control information from a device. The processing circuitry is further configured to receive a plurality of user equipment (UE) positions and parameters from the device. The processing circuitry is further configured to predict with a first artificial intelligence (AI) engine a plurality of beam patterns within a beam index at a plurality of nodes corresponding with a predicted UE location based on the plurality of UE trajectories and parameters of each UE. The processing circuitry is further configured to transmit the plurality of predicted beam patterns to the plurality of nodes corresponding with a corresponding UE of a plurality of UEs. The processing circuitry is further configured to receive a plurality of UE selected beam patterns from the plurality of nodes. The processing circuitry is further configured to store the plurality of UE selected beam patterns of the plurality of UEs. The processing circuitry is further configured to train a second AI engine based upon the plurality of UE selected beam patterns. The processing circuitry is further configured to update the first AI engine based on learned results from the second AI engine.

In some embodiments, the processing circuitry is further configured to execute the instructions to sample, by the second AI engine, random batches of the plurality of UE selected beam patterns of the plurality of UEs.

In some embodiments, the processing circuitry is further configured to execute the instructions to estimate a UE position based upon a UE selected beam pattern of the UE without location information in response to a UE location being unavailable.

In some embodiments, the processing circuitry is further configured to execute the instructions to store beam prediction data in a shared database.

An aspect of this description further relates to a user equipment trajectory based beam selection method. The method includes requesting out-of-band (OOB) information from a server. The method further includes receiving user equipment (UE) position and parameters from the server. The method further includes predicting, using a prediction algorithm, a beam trajectory corresponding to a predicted beam pattern within a beam index at a node corresponding with the UE based on the UE positon and parameters. The method further includes transmitting the predicted beam trajectory to the node corresponding with the UE. The method further includes receiving a UE selected beam pattern of the UE. The method further includes storing the UE selected beam pattern of the UE. The method further includes updating a weighting algorithm based upon the UE selected beam pattern. The method further includes modifying the prediction algorithm based on the updated weighting algorithm.

In some embodiments, the method further includes sampling random batches of stored UE selected beam patterns.

In some embodiments, modifying the prediction algorithm based on the updated weighting algorithm includes determining by a first artificial intelligence (AI) engine corresponding to the weighting algorithm a weighted update for a second AI engine corresponding to the prediction algorithm based on the sampled random batches of stored UE selected beam patterns.

In some embodiments, the method further includes transferring the weighted update periodically from the first AI engine to the second AI engine.

In some embodiments, the storing the UE selected beam pattern of the UE includes labelling the UE selected beam pattern of the UE.

In some embodiments, the receiving the UE selected beam pattern for the UE includes updating a UE location and beam selected from the beam index.

In some embodiments, the receiving the UE selected beam pattern for the UE includes labelling the UE selected beam pattern of the UE.

In some embodiments, the receiving the UE selected beam pattern for the UE includes updating a UE vector for the UE based upon updated UE location of the UE.

In some embodiments, the method further includes monitoring a location of the UE and the UE selected beam pattern of the beam index.

In some embodiments, the predicting the beam trajectory corresponding to the predicted beam pattern within the beam index at the node corresponding with the UE based on the UE positon and parameters, using the prediction algorithm, includes generating a vector corresponding to a UE's trajectory and velocity.

In some embodiments, the predicting the beam trajectory corresponding to the predicted beam pattern within the beam index at the node corresponding with the UE based on the UE positon and parameters, using the prediction algorithm, includes receiving the vector corresponding to the UE at a first AI engine corresponding to the prediction algorithm.

In some embodiments, the receiving the UE trajectory and parameters from the server includes generating the vector corresponding to the UE's trajectory and velocity at a pre-processing unit.

In some embodiments, the generating the vector corresponding to the UE's trajectory and velocity at a pre-processing unit is based upon at least one or more of (1) a UE velocity data, (2) a UE priority level, and (3) UE location data.

In some embodiments, the predicting the beam trajectory corresponding to the predicted beam pattern within the beam index at the node corresponding with the UE based on the UE positon and parameters, using the prediction algorithm, includes receiving at a first AI engine the UE trajectory and parameters from the server.

In some embodiments, the predicting the beam trajectory corresponding to the predicted beam pattern within the beam index at the node corresponding with the UE based on the UE positon and parameters, using the prediction algorithm, includes determining the predicted beam pattern of the node for the UE based on the generated vector and the UE trajectory and parameters.

In some embodiments, the method further includes estimating the UE location based on a UE selected beam of a corresponding node for the UE responsive to a UE location being unavailable.

In some embodiments, the method further includes generating a vector corresponding to the estimated UE location.

An aspect of this description relates to a radio access network intelligent controller (RIC). The RIC includes processing circuitry and memory operably connected to the processing circuitry. The memory is configured to store instructions that when executed by the processing circuitry cause the processing circuitry to use user equipment trajectory to determine beam selection. The processing circuitry is configured to request to initiate out-of-band information transmission that includes a user equipment (UE) list corresponding to a plurality of UEs from a device. The processing circuitry is configured to receive a plurality of UE paths, parameters, and beam selection policies from the device. The processing circuitry is configured to request to initiate UE identification data (ID) collection from a plurality of nodes. The processing circuitry is configured to receive the UE ID collection from the plurality of nodes. The processing circuitry is configured to transmit a plurality of predicted beams in a plurality of beam sequences for a plurality of corresponding UEs from a first artificial intelligence (AI) engine to the plurality of nodes.

In some embodiments, the processing circuitry is further configured to execute the instructions to request to initiate UE beam selection data collection from the plurality of nodes.

In some embodiments, the processing circuitry is further configured to execute the instructions to receive the UE beam selection data collection from the plurality of nodes.

In some embodiments, the processing circuitry is further configured to execute the instructions to generate batches of labelled data that contains the UE beam selection data collected from the plurality of nodes.

In some embodiments, the processing circuitry is further configured to execute the instructions to train a second AI engine to reduce differences between the UE beam selection data and the predicted beams responsive to the UE beam selection data collected from the plurality of nodes and the plurality of predicted beams in the plurality of beam sequences for the plurality of corresponding UEs from the first AI engine.

In some embodiments, the processing circuitry is further configured to execute the instructions to periodically update the first AI engine with weighted parameters output by the second AI engine.

An aspect of this description further relates to a non-transitory computer readable medium having instructions stored thereon that, when executed by a processing circuitry, cause an apparatus to: request call control information from a device; receive a plurality of user equipment (UE) positions and parameters from the device; predict with a first artificial intelligence (AI) engine a plurality of beam patterns within a beam index at a plurality of nodes corresponding with a predicted UE location based on the plurality of UE positons and parameters of each UE; transmit the plurality of predicted beam patterns to the plurality of nodes corresponding with a corresponding UE of a plurality of UEs; receive a plurality of UE selected beam patterns from the plurality of nodes; store the plurality of UE selected beam patterns of the plurality of UEs; train a second AI engine based upon the plurality of UE selected beam patterns; and update the first AI engine based on learned results from the second AI engine.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should further realize that such equivalent constructions do not depart from the spirit and scope of the present disclosure, and that they may make various changes, substitutions, and alterations herein without departing from the spirit and scope of the present disclosure.

What is claimed is:

1. A method comprising:
requesting out-of-band (OOB) information from a device;
receiving user equipment (UE) position and parameters from the device;
predicting, using a prediction algorithm, a beam trajectory corresponding to a predicted beam pattern within a beam index at a node corresponding with the UE based on the UE trajectory and parameters;
transmitting the predicted beam trajectory to the node corresponding with the UE;
receiving a UE selected beam pattern of the UE;
storing the UE selected beam pattern of the UE;
updating a weighting algorithm based upon the UE selected beam pattern; and
modifying the prediction algorithm based on the updated weighting algorithm.

2. The method of claim 1, further comprising:
sampling random batches of stored UE selected beam patterns.

3. The method of claim 2, wherein the modifying the prediction algorithm based on the updated weighting algorithm further comprises:
determining, by a first artificial intelligence (AI) engine corresponding to the weighting algorithm, a weighted update for a second AI engine corresponding to the prediction algorithm based on the sampled random batches of stored UE selected beam patterns.

4. The method of claim 3, further comprising:
transferring the weighted update periodically from the first AI engine to the second AI engine.

5. The method of claim 1, wherein the storing the UE selected beam pattern of the UE further comprises:
labelling the UE selected beam pattern of the UE.

6. The method of claim 1, wherein receiving the UE selected beam pattern for the UE further comprises:
updating a UE location and beam selected from the beam index;
labelling the UE selected beam pattern of the UE; and
updating a UE vector for the UE based upon updated UE location of the UE.

7. The method of claim 1; further comprising:
monitoring a location of the UE and the UE selected beam pattern of the beam index.

8. The method of claim 1, wherein the predicting, using the prediction algorithm, the beam trajectory corresponding to the predicted beam pattern within the beam index at the node corresponding with the UE based on the UE trajectory and parameters further comprises:
generating a vector corresponding to a UE's trajectory and velocity; and
receiving at a first AI engine corresponding to the prediction algorithm the vector corresponding to the UE.

9. The method of claim 8, wherein the receiving the UE trajectory and parameters from the device further comprises:
generating the vector corresponding to the UE's trajectory and velocity at a pre-processing unit based upon at least one or more of:
a UE velocity data;
a UE priority level;
UE location data; and
receiving at a first AI engine the UE trajectory and parameters from the device; and
determining the predicted beam pattern of the node for the UE based on the generated vector and the UE trajectory and parameters.

10. The method of claim 1, further comprising:
responsive to a UE location being unavailable, estimating the UE location based on a UE selected beam of a corresponding node for the UE.

11. The method of claim 10, further comprising:
generating a vector corresponding to the estimated UE location.

12. A system comprising:
processing circuitry; and
memory operably connected to the processing circuitry, the memory configured to store instructions that when executed by the processing circuitry cause the processing circuitry to:
request call control information from a device;
receive a plurality of user equipment (UE) positions and parameters from the device;
predict with a first artificial intelligence (AI) engine a plurality of beam patterns within a beam index at a plurality of nodes corresponding with a predicted UE location based on the plurality of UE positions and parameters of each UE;
transmit the plurality of predicted beam patterns to the plurality of nodes corresponding with a corresponding UE of a plurality of UEs;
receive a plurality of UE selected beam patterns from the plurality of nodes;
store the plurality of UE selected beam patterns of the plurality of UEs;
train a second AI engine based upon the plurality of UE selected beam patterns; and
update the first AI engine based on learned results from the second AI engine.

13. The system of claim 12, wherein the instructions further cause the processing circuitry to:
sample, by the second AI engine, random batches of the plurality of UE selected beam patterns of the plurality of UEs.

14. The system of claim 12, wherein the instructions further cause the processing circuitry to:
in response to a UE location being unavailable, estimate a UE position based upon a UE selected beam pattern of the UE without location information.

15. The system of claim 12, wherein the instructions further cause the processing circuitry to:
store in a shared database beam prediction data.

16. The system of claim 12, wherein the processing circuitry comprises:
a first processor in a communication controller.

17. The system of claim 16, wherein the processing circuitry comprises:
a second processor in a server communicatively coupled with the communication controller.

18. The system of claim 17, wherein the processing circuitry comprises:
a third processor in a distribution unit communicatively coupled with the communication controller.

19. An communication controller comprising:
processing circuitry;
memory operably connected to the processing circuitry, the memory configured to store instructions that when executed by the processing circuitry cause the processing circuitry to:

request to initiate out-of-band information transmission that includes a user equipment (UE) list corresponding to a plurality of UEs from a device;

receive a plurality of UE paths, parameters, and beam selection policies from the device;

request to initiate UE identification data (ID) collection from a plurality of nodes;

receive the UE ID collection from the plurality of nodes; and transmit a plurality of predicted beams in a plurality of beam sequences for a plurality of corresponding UEs from a first artificial intelligence (AI) engine to the plurality of nodes.

20. The communication controller of claim 19, wherein the instructions further cause the processing circuitry to:

request to initiate UE beam selection data collection from the plurality of nodes; and receive the UE beam selection data collection from the plurality of nodes.

21. The communication controller of claim 20, wherein the instructions further cause the processing circuitry to:

generate batches of labelled data that contains the UE beam selection data collected from the plurality of nodes.

22. The communication controller of claim 21, wherein the instructions further cause the processing circuitry to:

responsive to the UE beam selection data collected from the plurality of nodes and the plurality of predicted beams in the plurality of beam sequences for the plurality of corresponding UEs from the first AI engine, train a second AI engine to reduce differences between the UE beam selection data and the predicted beams.

23. The communication controller of claim 22, wherein the instructions further cause the processing circuitry to:

periodically update the first AI engine with weighted parameters output by the second AI engine.

24. The communication controller of claim 19, wherein the communication controller is a radio access network intelligent controller (RIC).

25. A non-transitory computer readable medium having instructions stored thereon that, when executed by processing circuitry, cause an apparatus to:

request call control information from a device;

receive a plurality of user equipment (UE) positions and parameters from the device;

predict with a first artificial intelligence (AI) engine a plurality of beam patterns within a beam index at a plurality of nodes corresponding with a predicted UE location based on the plurality of UE positions and parameters of each UE;

transmit the plurality of predicted beam patterns to the plurality of nodes corresponding with a corresponding UE of a plurality of UEs;

receive a plurality of UE selected beam patterns from the plurality of nodes;

store the plurality of UE selected beam patterns of the plurality of UEs;

train a second AI engine based upon the plurality of UE selected beam patterns; and update the first AI engine based on learned results from the second AI engine.

* * * * *